United States Patent [19]

Goetz et al.

[11] Patent Number: 5,504,146

[45] Date of Patent: Apr. 2, 1996

[54] TOUGHENED PARTLY AROMATIC COPOLYAMIDES

[75] Inventors: Walter Goetz, Ludwigshafen; Christoph Plachetta, Limburgerhof; Uwe Wolf, Starnberg; Gerd Blinne, Bobenheim; Horst Reimann, Worms, all of Germany

[73] Assignee: BASF Aktiengesellschaft, Ludwigshafen, Germany

[21] Appl. No.: 280,734

[22] Filed: Jul. 26, 1994

Related U.S. Application Data

[63] Continuation-in-part of Ser. No. 816,549, Dec. 30, 1991, abandoned, which is a continuation of Ser. No. 308,446, Feb. 10, 1989, abandoned.

[30] Foreign Application Priority Data

Feb. 12, 1988 [DE] Germany .................. 38 04 372.6

[51] Int. Cl.$^6$ .................. C08K 7/02; C08K 7/14; C08K 7/20; C08G 69/28
[52] U.S. Cl. .................. 524/607; 524/494
[58] Field of Search .................. 524/607; 528/324, 528/347; 52/323, 326, 329.1, 335, 331, 338, 339

[56] References Cited

U.S. PATENT DOCUMENTS

| | | | |
|---|---|---|---|
| 3,621,089 | 11/1971 | Edgar et al. | 264/211 |
| 4,537,949 | 8/1985 | Schmidt et al. | 528/335 |
| 4,603,166 | 2/1986 | Poppe et al. | 524/606 |

*Primary Examiner*—Edward J. Webman
*Attorney, Agent, or Firm*—Oblon, Spivak, McClelland, Maier & Neustadt

[57] ABSTRACT

Thermoplastic molding materials contain, as essential components,

A) 40–95% by weight of a partly aromatic copolyamide having a triamine content of less than 0.5% by weight, consisting essentially of $A_1$) 20–90% by weight of units derived from terephthalic acid and hexamethylenediamine, $A_2$ 5–50% by weight of units derived from ε-caprolactam and $A_3$) 0–80% by weight of units derived from adipic acid and hexamethylenediamine, and B) 5–60% by weight of fibrous or particulate fillers or mixtures of these.

8 Claims, No Drawings

TOUGHENED PARTLY AROMATIC COPOLYAMIDES

This is a continuation-in-part of application Ser. No. 07/816,549, filed Dec. 30, 1991, now abandoned, which is a continuation of Ser. No. 07/308,446, filed Feb. 10, 1989, now abandoned.

The present invention relates to thermoplastic molding materials containing, as essential components, A) 40–95% by weight of a partly aromatic copolyamide, essentially consisting of
  $A_1$) 20–90% by weight of units derived from terephthalic acid and hexamethylenediamine
  $A_2$) 5–50% by weight of units derived from ε-caprolactam and
  $A_3$) 0–80% by weight of units derived from adipic acid and hexamethylenediamine, and
B) 5–60% by weight of fibrous or particulate fillers or mixtures of these.

The present invention furthermore relates to the use of such thermoplastic molding materials for the production of fibers, films and moldings, and to the moldings obtainable from the thermoplastic molding materials as essential components.

BACKGROUND OF THE INVENTION

Field of the Invention

Polyamides, such as poly-ε-caprolactam and polyhexamethyleneadipamide, are among the engineering plastics which have been known, and are used in many fields. They generally possess great hardness and rigidity and good heat distortion resistance and are also resistant to abrasion and wear and to many chemicals. The toughening of such polyamides is likewise known and is described in, for example, DE-A 26 22 973 and U.S. Pat. No. 3,976,771, to mention but two examples.

For some intended uses, however, it would be desirable for the heat distortion resistance of the polyamides to be further improved without the remaining mechanical properties, in particular the impact strength, being adversely affected, as well as evincing an improved modulus of elasticity, such modulus not being affected by ambient humidity.

Copolyamides in which some of the aliphatic units are replaced by aromatic units have long been known, for example copolyamides of adipic acid, terephthalic acid, hexamethylenediamine and ε-caprolactam in any combination.

Thus, German Patent 929,151 describes a process for the preparation of highly polymeric linear polyamides, in which a mixture of an aromatic para-dicarboxylic acid or an amide-forming derivative thereof, an equivalent amount of an aliphatic or cycloaliphatic diamine and another polyamide-forming starting material, for example a lactam, is condensed under polyamide-forming conditions.

British Patent 1,114,541 describes ternary copolyamides which, in addition to a major amount of poly-hexamethyleneadipamide, contain 20–40% by weight of units derived from terephthalic acid and hexamethylenediamine and 2–20% by weight of another polyamide component.

German Laid-Open Application DOS 1,669,455 describes a process for the preparation of stretched polyamide filaments by melt-spinning a copolyamide, wherein the copolyamide contains not more than 40% by weight of units derived from terephthalic acid and hexamethylenediamine, and the preparation of these polyamides is carried out in the presence of not less than 3 mol % of a monofunctional acidic or basic stabilizer.

German Laid-Open Application DOS 1,620,997 describes linear fiber-forming terpolyamides which contain units derived from adipic acid and hexamethylenediamine, from terephthalic acid and hexamethylenediamine and from isophthalic acid and hexamethylenediamine.

German Laid-Open Application DOS 3,407,492 describes a process for the preparation of copolyamides from adipic acid, terephthalic acid and hexamethylenediamine, wherein the copolyamide contains 25–48% by weight of units of hexamethyleneterephthalamide and, in the process, a 40–70% strength aqueous solution of the monomers is heated to not less than 250° C. in less than 15 minutes and is condensed to a relative viscosity of 1.5–2.4. Thereafter, the water is distilled off in one or more stages, and the resulting precondensate is subjected to postcondensation in a known manner.

None of the above-mentioned publications contains more detailed information or indications regarding the behavior of the partly aromatic copolyamides described on modification with fibrous or particulate fillers.

During investigations into modification of the partly aromatic copolyamides described above with fillers, we have found that the products have a high melt viscosity, and moldings produced from the materials could only be processed under high filling pressure and had many gel particles and specks, i.e., a poor surface quality. Moreover, owing to the gel particles, the filler distribution was uneven and therefore unsatisfactory.

SUMMARY OF THE INVENTION

It is an object of the present invention to provide filler-containing thermoplastic molding materials based on partly aromatic copolyamides, the said molding materials being capable of being processed by injection molding under low filling pressure to give moldings having better surface quality.

It is another object to provide filler-containing thermoplastic molding materials based on partly aromatic copolyamides having improved mechanical properties, especially an improved modules of elasticity, such modules not being affected by ambient humidity.

We have found that these objects are achieved, according to the invention, by the thermoplastic molding materials defined at the outset.

DESCRIPTION OF THE PREFERRED EMBODIMENTS

The partly aromatic copolyamides A) present in the novel thermoplastic molding materials contain, as component A1), 20–90% by weight of units derived from terephthalic acid and hexamethylenediamine. A small amount of the terephthalic acid, preferably not more than 10% by weight of the total amount of aromatic dicarboxylic acids used, can be replaced by isophthalic acid or other aromatic dicarboxylic acids, preferably those in which the carboxyl groups are in the para position.

In addition to the units derived from terephthalic acid and hexamethylenediamine, the copolyamides A) contain units derived from ε-caprolactam, optionally also units derived from adipic acid and hexamethylenediamine.

The amount of units derived from ε-caprolactam is 5 to not more than 50, preferably 20–50, in particular 25–40%, by weight, while the amount of units derived from adipic acid and hexamethylenediamine is not more than 80, preferably 30–75, in particular 35–65%, by weight.

The copolyamides A) may contain both units of ε-caprolactam and units of adipic acid and hexamethylenediamine; in this case, it is advantageous if the amount of units which are free of aromatic groups is not less than 10, preferably not less than 20%, by weight. The ratio of the units derived from ε-caprolactam to those derived from adipic acid and hexamethylenediamine is not subject to any particular restrictions.

Polyamides containing 50–80, in particular 60–75%, by weight of units derived from terephthalic acid and hexamethylenediamine (units $A_1$) and 20–50, preferably 25–40, % by weight of units derived from ε-caprolactam (units $A_2$)) have proven particularly advantageous for many intended uses.

In addition to the units $A_1$ to $A_3$ described above, the partly aromatic copolyamides A) may also contain minor amounts, preferably not more than 15, in particular not more than 10%, by weight of further polyamide building blocks, as known for other polyamides. These building blocks may be derived from dicarboxylic acids of 4 to 16 carbon atoms and aliphatic or cycloaliphatic diamines of 4 to 16 carbon atoms and from aminocarboxylic acids or corresponding lactams of 7 to 12 carbon atoms. Some suitable monomers of this type are suberic acid, azelaic acid, sebacic acid and isophthalic acid, as typical examples of the dicarboxylic acids, 1,4-butanediamine, 1,5-pentanediamine, piperazine, 4,4'-diaminodicyclohexylmethane, 2,2-(4,4'-diaminodicyclohexyl)-propane and 3,3'-dimethyl-4,4'-diaminodicyclohexylmethane, as typical examples of the diamines, and capryllactam, enantholactam, omega-aminoundecanoic acid and laurolactam, as typical examples of lactams or aminocarboxylic acids.

An essential feature of the partly aromatic copolyamides is that their triamine content is less than 0.5, preferably less than 0.3%, by weight.

Partly aromatic copolyamides prepared by most of the known processes (cf. the publications stated at the beginning) have triamine contents greater than 0.5% by weight, which leads to a deterioration in product quality and to problems in preparation by a continuous method. A triamine which particularly gives rise to this problem is dihexamethylenetriamine, which is formed from the hexamethylenediamine used in the preparation.

Copolyamides having a low triamine content have the same solution viscosity but lower melt viscosities compared with products of the same composition which have a higher triamine content. This considerably improves both the processibility and the product properties.

The melting points of the partly aromatic copolyamides A) are from 260° C. to above 300° C., this high melting point also being associated with a high glass transition temperature of, as a rule, more than 75° C., in particular more than 85° C. (in the dry state).

Binary copolyamides based on terephthalic acid, hexamethylenediamine and ε-caprolactam and containing bout 70% by weight of units derived from terephthalic acid and hexamethylenediamine have melting points of 300° C. and (in the dry state) a glass transition temperature of more than 110° C.

Binary copolyamides based on terephthalic acid, adipic acid and hexamethylenediamine have melting points of 300° C. or higher even when they contain as little as about 55% by weight of units of terephthalic acid and hexamethylenediamine (HMD), the glass transition temperature not being quite as high as in the case of binary copolyamides which contain ε-caprolactam instead of adipic acid or adipic acid/HMD.

The preparation of the preferred partly aromatic copolyamides having a low triamine content can be carried out by the processes described in EP-A 129 195 and 129 196.

In these processes, an aqueous solution of the monomers, in this case the monomers which form the units old $A_1$) to $A_3$), is heated to 250°–330° C. under superatmospheric pressure with simultaneous evaporation of water and formation of a prepolymer, the prepolymer and the vapor are continuously separated, the vapor is rectified and the entrained diamines are recycled. Finally, the prepolymer is passed into a polycondensation zone and is subjected to polycondensation under 1–10 bar gage pressure and at 250°–330° C. It is essential in this process that the aqueous salt solution is heated under 1–10 bar gage pressure for a residence time of less than 60 seconds, the conversion advantageously being not less than 93% and the water content of the prepolymer not more than 7% by weight on emergence from the evaporator zone.

As a result of these short residence times, the formation of triamines is substantially prevented.

The aqueous solutions used have, as a rule, monomer contents of 30–70, in particular 40–65%, by weight.

The aqueous salt solution is advantageously fed continuously at a temperature of 50°–100° C. into an evaporator zone where the aqueous salt solution is heated to 250°–330° C. under 1–10, preferably 2–6, bar gage pressure. Of course, the temperature used is above the melting point of the particular polyamide to be prepared.

As stated above, it is essential that the residence time in the evaporator zone is not more than 60, preferably 10–55, in particular 10–40, seconds.

The conversion on emergence from the evaporator zone is not less than 93%, preferably 95–98%, and the water content is preferably 1–5, in particular 1–3%, by weight.

The evaporator zone is advantageously in the form of a tube bundle. Tube bundles in which the cross-sections of the individual tubes are alternately tubular and slot-like have proven particularly suitable.

It has also proven advantageous if, prior to separation of the phases, the mixture of prepolymer and vapor is passed, directly downstream of the evaporator zone, through a tubular mass transfer zone provided with baffles. The temperature and pressure conditions used in the evaporator zone are maintained here. The baffles, for example packaging, such as Raschig rings, metal rings or, in particular, wire mesh packing, produce a large surface area. As a result, the phases, i.e., prepolymer and vapor, are brought into intimate contact. Consequently, the amount of diamine liberated with steam is considerably reduced. As a rule, the residence time maintained in the mass transfer zone is from 1 to 15 minutes. The mass transfer zone is advantageously in the form of a tube bundle.

The two-phase vapor/prepolymer mixture emerging from the evaporator zone or mass transfer zone is separated. As a rule, separation takes place automatically, owing to the physical differences in one vessel, the lower part of the vessel advantageously constituting the polymerization zone. The vapors liberated essentially consist of steam and diamines which have been liberated during evaporation of the water. These vapors are passed into a column and rectified. Examples of suitable columns are packed columns, bubble tray columns or sieve tray columns having from 5 to 15 theoretical plates. The column is advantageously operated under pressure conditions identical to those in the evaporator zone. The diamines present in the vapors are separated off and recycled to the evaporator zone. It is also possible to feed the diamines to the downstream polymerization zone. The rectified steam obtained is removed at the top of the column.

The resulting prepolymer, which, depending on its conversion, essentially consists of a low molecular weight polyamide and may contain residual amounts of unconverted salts, and as a rule has a relative viscosity of 1.2–1.7, is passed into a polymerization zone. In this zone, the melt obtained is subjected to polycondensation at 250°–330° C. In particular 270°–310° C., and under 1–10, in particular 2–6, bar gage pressure. Advantageously, the vapors liberated are rectified together with the above-mentioned vapors in the column, a residence time of 5–30 minutes preferably being maintained in the polycondensation zone. The resulting polyamide, which as a rule has a relative viscosity of 1.2–2.3, is removed continuously from the condensation zone.

In a preferred procedure, the polyamide thus obtained is passed, in the form of a melt, through a discharge zone, with simultaneous removal of the residual water present in the melt. Examples of suitable discharge zones are devolatilization extruders. The melt freed from water in this manner is then extruded, and the extrudates are granulated. The resulting granules are advantageously condensed in the solid phase by means of superheated steam at a temperature below the melting point, e.g., 170°–240° C., until the desired viscosity is obtained. The steam obtained at the top of the column is advantageously used for this purpose.

After the solid-phase postcondensation, the relative viscosity is in general 2.2–5.0, preferably 2.3–4.5, measured in 1% strength by weight solution in 96% strength by weight $H_2SO_4$ at 23° C.

In another preferred procedure, the polyamide melt discharged from the polycondensation zone is passed into a further polycondensation zone, where it is condensed with continuous formation of new surfaces, at from 285° to 310° C., advantageously under reduced pressure, e.g., 1–500 mbar, until the desired viscosity is obtained. Suitable apparatuses are known as finishers.

A further process similar to that described above is described in EP-A 129 196; for further details, reference may be made to the publication.

The novel molding materials contain, as component B), from 5 to 60, in particular from 7 to 50, particularly preferably from 10 to 35%, by weight of a fibrous or particulate filler or mixtures of such fillers.

Glass fibers, carbon fibers, Aramid fibers, potassium titanate fibers and fibrous silicates, such as wollastonite, may be mentioned here merely as examples of fibrous fillers.

When glass fibers are used, they may be treated with a size or an adhesion promoter in order to improve compatibility with the polyamide.

In general, the glass fibers used have a diameter of 6–20 μm. They can be incorporated both in the form of chopped glass fibers and in the form of rovings. In the finished injection molded article, the mean length of the glass fibers is preferably from 0.08 to 5 mm.

Glass spheres, particulate wollastonite, powdered quartz, boron nitride, kaolin, calcium carbonate (chalk), magnesium carbonate and titanium dioxide are merely typical examples of particulate fillers, wollastonite, titanium dioxide and kaolin generally being preferred.

In addition to the essential components A) and B), the novel molding materials may contain conventional additives and processing assistants. The amount of these is in general not more than 20, preferably not more than 10% by weight, based on the total weight of the components A) and B).

Examples of conventional additives are stabilizers and antioxidants, flameproofing agents, heat stabilizers and UV stabilizers, lubricants and mold release agents, colorants, such as dyes and pigments, and plasticizers.

Antioxidants and heat stabilizers which may be added to the thermoplastic materials according to the invention are, for example, halides of metals of group I of the Periodic Table, for example sodium halides, potassium halides and lithium halides, if necessary in conjunction with copper (I) halides, for example chloride, bromide or iodide. Sterically hindered phenols, hydroquinones, substituted members of this group and mixtures thereof can also be used, preferably in concentrations of not more than 1% by weight, based on the weight of the mixture.

Examples of UV stabilizers are various substituted resorcinols, salicylates, benzotriazoles and benzohenones, which are used in general in amounts of not more than 2.0% by weight.

Lubricants and mold release agents, which, as a rule, are added in amounts of not more than 1% by weight, based on the thermoplastic material, are stearic acids, stearyl alcohol, alkyl stearates and stearamides, and also esters of pentaerythritol with long-chain fatty acids.

The novel molding materials can be prepared by a conventional process, by mixing the starting components in a conventional mixing apparatus, such as a screw extruder, a Brabender mill or a Banbury mill, and then extruding the mixture. After extrusion, the extrudates are cooled and comminuted. The mixing temperatures are in general from 260° to 350° C., preferably from 280° to 340° C.

Compared with corresponding molding materials based on aliphatic polyamides, the novel toughened thermoplastic molding materials possess, in particular, very low and uniform shrinkage. In addition, the better heat distortion resistance of the partly aromatic copolyamides are also advantageous in this respect.

Compared with thermoplastic molding materials based on partly aromatic copolyamides having a higher triamine content, the substantially improved surface quality of the moldings and improved mechanical properties, especially an improved modulus of elasticity, it not being affected by ambient humidity, obtainable from the materials is advantageous.

Because of their well balanced range of properties, the novel molding materials are particularly suitable for the production of fibers, films and moldings, in particular for housing components.

EXAMPLES

The following components were used:

Component A

A/1: Copolyamide consisting of 30% by weight of units derived from ε-caprolactam and 70% by weight of units derived from terephthalic acid and hexamethylenediamine An aqueous solution, consisting of 35 kg of ε-caprolactam, 55 kg of terephthalic acid, 38.5 kg of hexamethylenediamine and 128.5 kg of water, was transported from a heated stock container at about 80° C. at a rate corresponding to an amount of polyamide of 5 kg/hour, by means of a metering pump, into a partially horizontal and partially vertical tube evaporator. The evaporator was heated with a liquid heating medium which was at 295° C., with vigorous circulation. The evaporator had a length of 3 m, a capacity of 180 ml and a heat-transfer surface of about 1300 cm$^2$. The residence time in the evaporator was 50 sec. The prepolymer/steam mixture emerging from the evaporator was at 290° C. and was separated into steam melt in a separator. The melt remained in the separator for a further 10 minutes and was then extruded by means of a screw extruder having a devolatilization zone, solidified in a water bath and then granulated. The separator and the evaporator zone were kept under a pressure of 5 bar by means of a pressure regulating apparatus which was arranged downstream of the column. The steam separated off in the separator was fed into a packed column which had about 10 theoretical plates and into the top of which about 1 l of vapor condensate per hour was introduced to produce a reflux. The resulting temperature at the top of the column was 152° C. The steam emerging downstream of the pressure-relief valve was condensed; it contained less than 0.05% by weight of hexamethylenediamine and less than 0.1% by weight of ε-caprolactam. The bottom product of the column was an aqueous solution of hexamethylenediamine, which contained 80% by weight of hexamethylenediamine and from 1 to 3% by weight of ε-caprolactam, the percentages in each case being based on polyamide produced. The solution was added to the starting salt solution again upstream of the evaporator inlet, by means of a pump.

Downstream of the evaporator, the prepolymer had a relative viscosity of 1.25, measured in 98% strength by weight sulfuric acid at 28° C., and had a conversion of from 93 to 95%, according to terminal group analysis. The content of bishexamethylenetriamine was from 0.1 to 0.15% by weight, based on polyamide.

After the polymer melt had emerged from the separator, the polymer had a very pale intrinsic color and an extremely low content of bishexamethylenetriamine of 0.11% by weight and a relative viscosity of from 1.65 to 1.80.

The product had roughly equivalent contents of carboxyl and amino terminal groups.

The content of extractables (extraction with methanol) was from 3.1 to 3.3% by weight.

In the extruder, the melt was then let down to atmospheric pressure and underwent virtually no further condensation during a residence time of less than 1 minute. The resulting granules were condensed by continuous solid-phase condensation with superheated steam at 195° C. during a residence time of 30 hours to a Fikentscher K value of 67 (19/100 ml of 96% $H_2SO_4$). The content of extractables was 0.2% by weight (methanol extract).

A/V$_1$: Partly aromatic copolyamide having a composition similar to A/1, but a triamine content of 0.62% by weight.

B/1: Glass fibers (Gevetex® 5129)

B/2: Wollastonite (Wicroll® 10)

The components A and B were mixed in the weight ratios shown in the Table, and the polyamide was melted at a mass temperature of 320° C. Thereafter, test boxes (cf. BASF-Kunstoffe Ultramid®, Issue 6/1985, FIG. 7, page 14) were produced on an injection molding machine of type BSKM 400.

The mass temperature was 320° C. and the mold surface temperature 80° C.

The required injection pressure and filling pressure and the number of specks per test box were determined (the mean values of 5 measurements in each case are shown in the Table).

Furthermore, the surface was evaluated visually.

The results of the measurements are likewise shown in the Table.

The results show the substantially improved processing properties of the novel molding materials.

| Example | 1 | 2V* | 3 | 4V* |
|---|---|---|---|---|
| Polyamide (% by weight) | 60A/1 | 60A/V1 | 70A/1 | 70A/V1 |
| Filler (% by weight) | 40B/1 | 40B/1 | 30B/2 | 30B2 |
| Filling pressure (bar) | 575 | 695 | 533 | 610 |
| Injection pressure (bar) | 845 | 920 | 805 | 880 |
| Surface | Smooth, glossy | Blooming, irregular surface | Smooth, glossy | Blooming, matt surface |
| Number of specks per test box | 0 | 12 | 0 | 16 |

V* = Comparative Experiments

What is claimed as new and desired to be secured by Letters Patent of the Unites States is:

1. A thermoplastic molding material containing, as essential components,
   A) 40–95% by weight of a partly aromatic copolyamide having a triamine content of less than 0.5% by weight, consisting essentially of
      A$_1$) 20–90% by weight of units derived from terephthalic acid and hexamethylenediamine,
      A$_2$) 5–50% by weight of units derived from ε-caprolactam and
      A$_3$) 0–80% by weight of units derived from adipic acid and hexamethylenediamine, and
   B) 5–60% by weight of fibrous or particulate fillers or mixtures of these.

2. A thermoplastic molding material as claimed in claim 1, wherein the triamine content of the partly aromatic copolyamide A) is less than 0.3% by weight.

3. A thermoplastic molding material as claimed in claim 1, wherein the partly aromatic copolyamides contain
   A$_1$) 50–80% by weight of units derived from terephthalic acid and hexamethylenediamine and
   A$_2$) 20–50% by weight of units derived from ε-caprolactam.

4. A thermoplastic molding material as claimed in claim 3, wherein the partly aromatic copolyamides A) contain
   A$_1$) 60–75% by weight of units derived from terephthalic acid and hexamethylenediamine and
   A$_2$) 25–40% by weight of units derived from ε-caprolactam.

5. A thermoplastic molding material as claimed in claim 1, which contains 10–50% by weight of fibrous or particulate fillers C).

6. A molding obtainable from a partly aromatic copolyamide as claimed in claim 1, as an essential component.

7. A molding obtainable from a partly aromatic copolyamide as claimed in claim 3, as an essential component.

8. A molding obtainable from a partly aromatic copolyamide as claimed in claim 4, as an essential component.

* * * * *